(12) United States Patent
Kibayashi

(10) Patent No.: US 6,550,947 B1
(45) Date of Patent: Apr. 22, 2003

(54) VEHICLE LAMP

(75) Inventor: Michinobu Kibayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 65 days.

(21) Appl. No.: 09/658,853

(22) Filed: Sep. 11, 2000

(30) Foreign Application Priority Data

Sep. 13, 1999 (JP) .......................................... 11-258274

(51) Int. Cl.[7] .............................................. F21V 14/04
(52) U.S. Cl. ...................................... 362/515; 362/528
(58) Field of Search ................................ 362/421, 512, 362/514, 515, 523, 528–532

(56) References Cited

U.S. PATENT DOCUMENTS 4,974,123 A    11/1990   Luallin et al. ............... 362/523
5,483,425 A  * 1/1996    Luallin et al. ............... 362/528
5,615,939 A  * 4/1997    Dobler et al. ................ 362/515
5,908,239 A    6/1999    Sugimoto ..................... 362/528
5,993,033 A    11/1999   Sugimoto et al. ............ 362/515
6,089,737 A  * 7/2000    Ito .............................. 362/523

FOREIGN PATENT DOCUMENTS

FR    002697899 A    6/1992
GB    2240389        12/1990
GB    2303667        7/1996

* cited by examiner

Primary Examiner—Alan Cariaso
(74) Attorney, Agent, or Firm—Fish & Richardson P.C.

(57) ABSTRACT

A device capable of tilting a reflector installed in a lamp body for adjusting the body's optical axis is provided. Workability of the process for securing the ball bearing to the reflector can be simplified and dislocation of the ball bearing can be prevented.

2 Claims, 6 Drawing Sheets

VEHICLE LAMP

FIELD OF THE INVENTION

The invention relates to a vehicle lamp provided with a built-in reflector holding a light source in its lamp body and a device for tilting the reflector so as to allow adjustment of the optical axis angle of the lamp.

BACKGROUND OF THE INVENTION

A known headlamp for a vehicle such as an automobile is provided with a so-called aiming adjusting mechanism in which a reflector installed in the lamp body is tilted in vertical and lateral directions to adjust the optical axis of the reflector. Also, there is a known headlamp provided with an automatic optical axis leveling mechanism that maintains the optical axis of the headlamp at a certain angle in response to the tilting movement of the vehicle body. In either case, the headlamp is required to have a device for tilting the reflector provided overall or inside the lamp so as to adjust the optical axis angle. For this purpose, the latter case, for example, the reflector installed in the lamp body is supported on one or more pivots so as to move tiltably along the direction required to perform optical axis adjustment in vertical and lateral directions relative to the lamp body. An actuator for tilting movement is provided at a position different from the aforementioned pivot so as to move a part of the reflector towards the tiltable direction. As a result, the reflector can be tilted along the required direction to adjust the optical axis angle.

To realize the aforementioned structure in which the part of the reflector is moved by the actuator for tilting movement, the position where the actuator and the reflector are joined is required to combine the linear movement generated by the actuator and the revolution movement about the pivots generated by the reflector. Both movements do not conflict with each other. For this purpose, there has been proposed a joint structure including a ball bearing of groove type (this structure is referred to as a grooved ball bearing hereinafter). FIG. 8 is a schematic view showing the structure of the conventional art. Specifically, the reflector 3 installed in the lamp body 1 is in the tiltable state in the vertical direction at the pivot (not shown). An actuator 31 for tilting movement is fixed to the lamp body 1 at the position opposite to the rear surface of the reflector 3. The actuator 31 for tilting movement has an actuator rod 32 provided with a spherical end 33 having a spherical end portion, which extends toward the optical axis of the lamp. As a result, the actuator rod 32 is structured to perform reciprocating movement along the extending direction upon driving. A stem 3c is integrally formed on the rear surface of the reflector 3 to extend from the position opposite to the actuator rod 32. The grooved ball bearing 21A is fixed to the tip end of the stem 3c using a screw 7.

The grooved ball bearing 21A is formed by resin molding and includes a groove 22 of a semi-tubular shape, a pair of engagement pieces 23 disposed along and at both sides of the groove 22 to protrude therefrom, each end piece 24 of which is bent at an acute angle to face the groove 22, and an anchor part 25 extending outward from the base of the engagement piece 23. The grooved ball bearing is fixed at its anchor part 25 to the stem 3c of the reflector 3 by the screws 7 so that an opening of the groove 22 faces the actuator 31 for tilting movement. The spherical end 33 of the actuator rod 32 is fitted in the gap defined by the groove 22 and the end piece 24 of the pair of engagement pieces 23. The spherical surface of the spherical end 33 abuts against the inner bottom surface of the groove 22 and the pair of end pieces 24. As a result, the spherical end 33 is pivotally supported to allow spherical movement at abutment points. In the above structure, the groove 22 and the engagement piece 23 keep their respective cross sections constant at any point along the axis of the groove, thus allowing a free movement of the spherical end 33 in the direction of the groove axis. When the actuator 31 moves the actuator rod 32 reciprocally in the optical axis direction, the grooved ball bearing 21A secured on the reflector 3 moves as the spherical end 33 moves in the optical axis direction. During this operation, the spherical end 33 is allowed to move along the groove 22 of the ball bearing 21A in its axial direction such that the reflector 3 is allowed to be relatively tilted in a predetermined direction to the actuator rod 32, that is, in the vertical direction in the present case.

SUMMARY OF THE INVENTION

The grooved ball bearing 21A is secured at both side anchor parts 25 on the stem 3c of the reflector 3 with screws 7 as described above. Such arrangement, therefore, requires the process of securing two screws 7 to mount the grooved ball bearing 21A onto the reflector, thus increasing man-hours for the assembly process and complicating the assembly work. Furthermore, if the screw 7 is threaded into a hole in an anchor part 25 having a diameter larger than that of the screw with much allowance, the grooved ball bearing 21 is likely to be out of the desired mounting position with respect to the stem 3c. Such dislocation may interfere with alignment between the axis of the actuator rod 32 and the center line of the groove 22 of the ball bearing. This prevents the groove 22 from admitting proper insertion of the spherical end 33 of the actuator rod 32. Even if the insertion is performed, a smooth movement of the actuator rod 32 and the grooved ball bearing 21 may be prevented. In addition, over the extended period of use, the screw 7 may be loosened, which would cause dislocation of the grooved ball bearing 21 relative to the reflector 3. Dislocation of the relative position between the grooved ball bearing 21 and the actuator rod 32 deteriorates the precise tilting of the reflector 3.

An object of the present invention is to provide a vehicle lamp having a device for tilting a reflector, which simplifies the work for assembling the grooved ball bearing and prevents deterioration of tilting movement of the reflector and assures smooth movement by preventing dislocation of the grooved ball bearing.

A vehicle lamp of the present invention is provided with a device for tilting a reflector installed in the lamp body for adjusting the optical axis of the reflector. The device comprises an actuator, for tilting movement disposed on the lamp body, having an actuator rod which is actuated to move linearly along the optical axis of the reflector and a ball bearing secured to the reflector to support pivotally the distal spherical end of the actuator rod so as to convert the linear movement into the tilting movement of the reflector. The ball bearing has first and second anchor parts to be secured to the reflector. The first anchor part is constructed to be secured to the reflector by a fastener means, and the second anchor part is constructed to be fitted with the reflector. The second anchor part has a plurality of fitting walls disposed to define a cross-shaped gap between the fitting walls. The reflector is integrally provided with a cross-shaped boss having a cross-shaped cross section, which can be fitted into the cross-shaped gap. Preferably, the second anchor part has a pin hole at the crossing center of the cross-shaped gap, and the reflector is provided with a pin projecting from the top end of the cross-shaped boss so as to be fitted into the pin hole.

In the present invention, the ball bearing is secured to the reflector by inserting the top end of the cross-shaped boss on the reflector into the cross-shaped gap defined by the walls at the second anchor part, while inserting the pin of the cross-shaped boss into the pin hole in the ball bearing. Then at the first anchor part, the ball bearing is secured to the reflector by the screws. In the process for securing the ball bearing to the reflector, the insertion process is only required at the second anchor part, and fastening the fastening means such as the screw is only required at the first anchor part. This makes it possible to improve assembly workability as a whole. Furthermore the joint system of the cross-shaped gap and boss at the second anchor part prohibits the relative dislocation of the ball bearing with respect to the reflector, thereby ensuring the smooth tilt movement realized by the device for tilting the reflector as well as improving precision in its tilt movement.

DETAILED DESCRIPTION OF THE INVENTION

Figure 1:
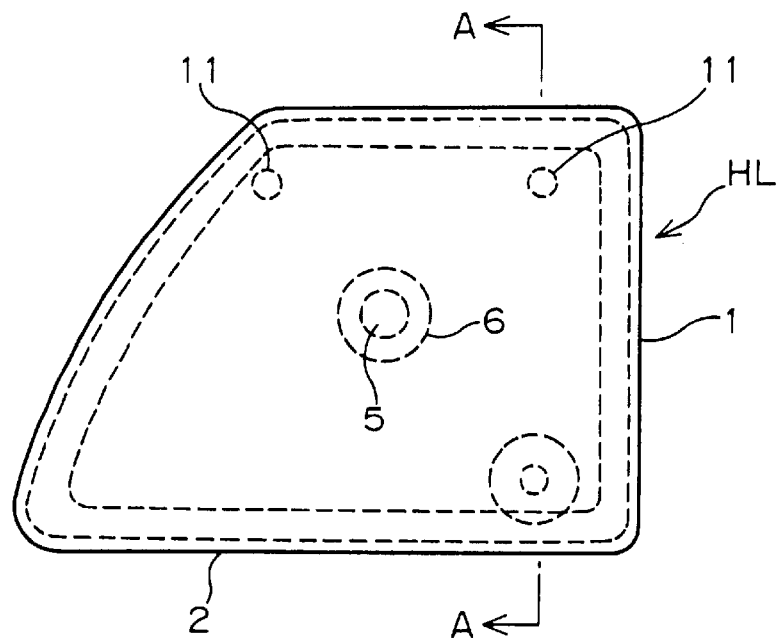
FIG. 1 is a front elevational view of a vehicle headlamp according to an embodiment of the present invention.
Figure 2:
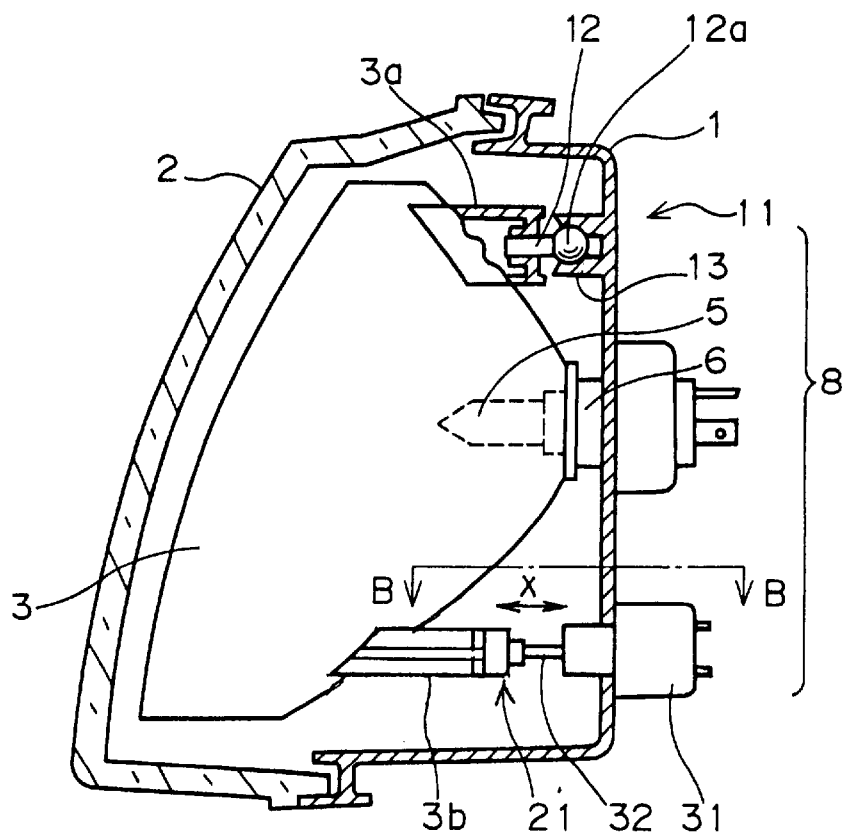
FIG. 2 is a cross-sectional view taken along line A—A in FIG. 1.
Figure 3:
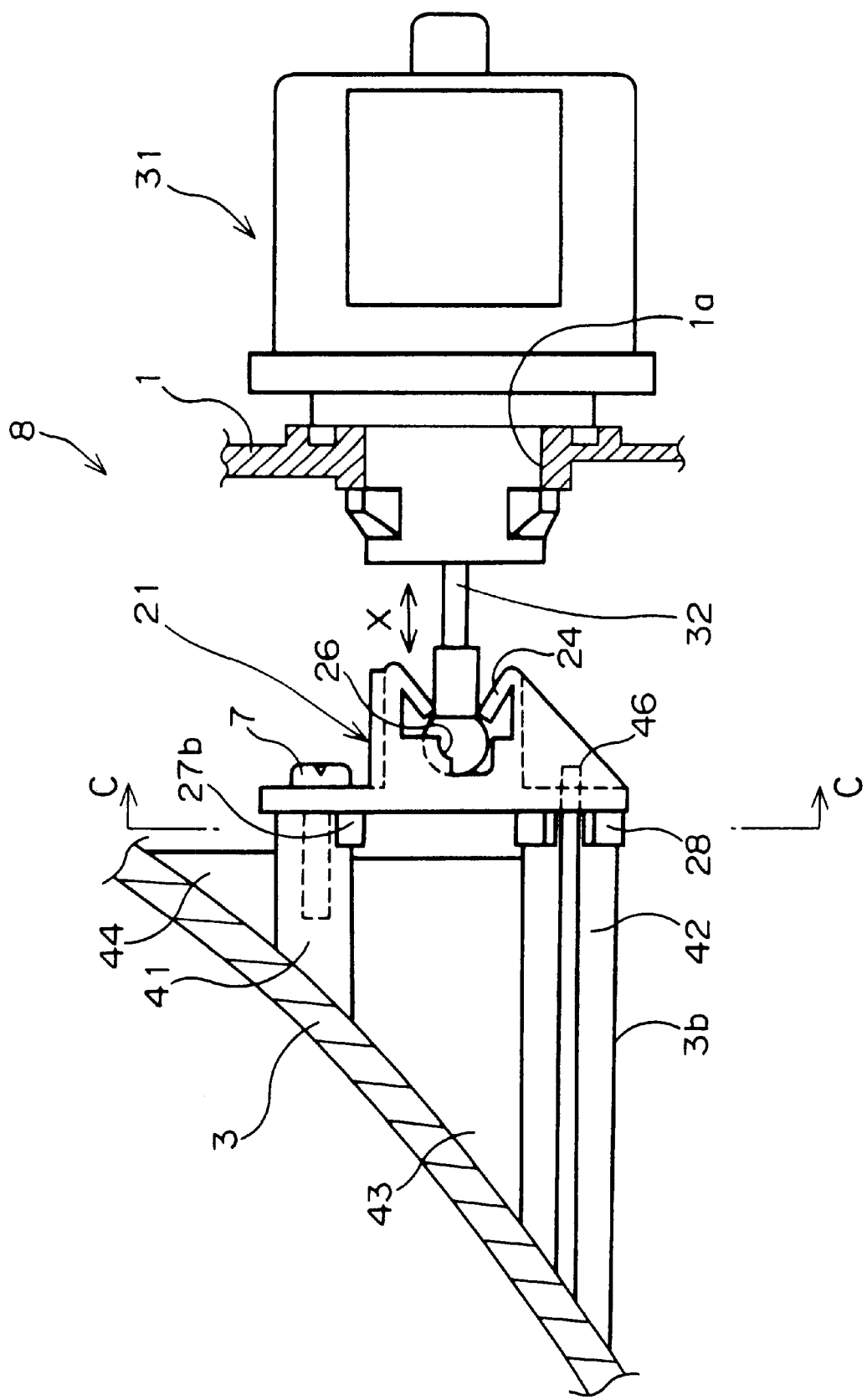
FIG. 3 is an enlarged plan view seen from line B—B in FIG. 2.

Embodiments of the present invention will be described referring to the attached drawings. FIG. 1 is a front elevational view of a headlamp for a vehicle incorporating the device for tilting reflector according to the first embodiment of the invention. FIG. 2 is a cross-sectional view taken along line A—A in FIG. 1. FIG. 3 is an enlarged plan view seen from line B—B in FIG. 2. The headlamp HL includes a lamp body 1, and a lens 2 is secured and sealed along the circumference edge of an front opening thereof. A lamp chamber is defined by the lamp body 1 and the lens 2. A reflector 3 molded of resin is disposed in the lamp chamber. The reflector 3 has a paraboloidal inner face for reflection, and a bulb-mounting bore at its center, in which a bulb socket 6 supporting a bulb 5 as a light source is detachably mounted. In addition, a device 8 for tilting the reflector in a vertical direction is provided so as to adjust the optical axis.

Now the device 8 for tilting reflector will be hereinafter described. The reflector 3 is supported to the lamp body 1 by means of pivot units 11 at its right and left points at the upper portion of its rear. The pivot unit 11 is composed of a ball shaft 12 press fitted to the top portion of the upper stem 3a disposed at two right and left points on the rear surface of the reflector 3 and protruding rearward therefrom, and a ball bearing 13 disposed on a part of the inner surface of the lamp body 1 having a spherical recess portion. Thus the end 12a of the ball shaft 12 is fitted in the ball bearing 13 so that the reflector 3 is tiltably moveable about the joint of the ball shaft 12 and the bearing 13.

The reflector 3 is provided with a lower stem 3b at a lower part on its back, which protrudes rearward therefrom. A grooved ball bearing 21 is secured to the end of the lower stem 3b. An actuator 31 for tilting movement is mounted on the back of the lamp body 1 via an opening 1a confronting the grooved ball bearing 21. The spherical end 33 having a substantially spherical shape of an actuator rod 32 extends from the actuator 31 to the lamp body 1 so as to be fitted into the grooved ball bearing. Although detailed description and drawings are omitted, the actuator 31 houses a motor and a worm wheel mechanism to be driven thereby such that the revolution drive from the motor extends and contracts (reciprocate) the actuator rod along its length. The actuator 31 is controlled by a control circuit which is not shown. In this embodiment, it is constructed to function such that the optical axis is maintained at a predetermined angle based on an output signal from a level sensor for detecting the horizontal position of the vehicle body.

Figure 4:
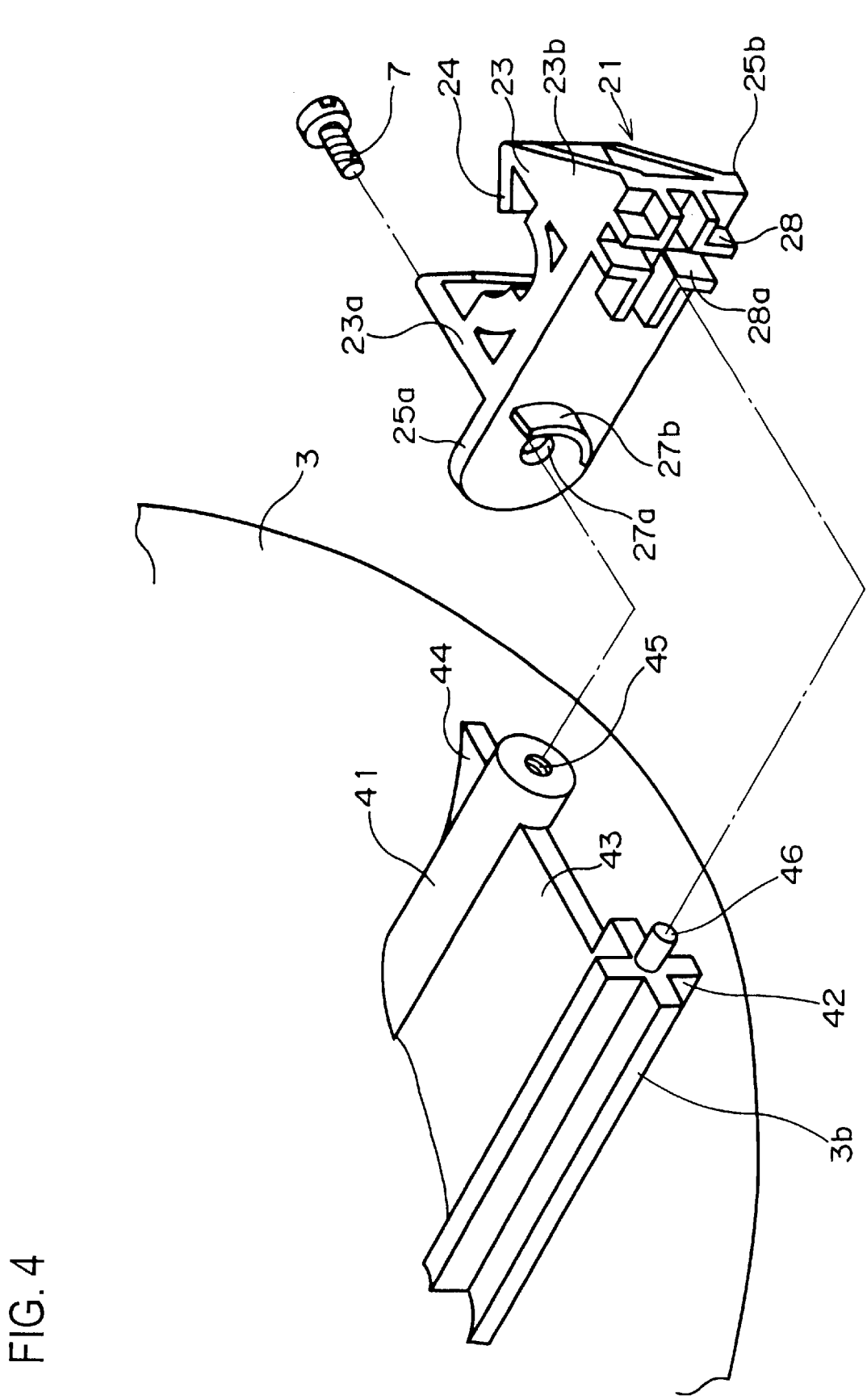
FIG. 4 is an exploded perspective view of the grooved ball bearing and the lower stem.

FIG. 4 is an exploded perspective view of the lower stem 3b and the grooved ball bearing 21. The lower stem 3b includes a cylindrical boss 41 having a circular cross section, and a cross-shaped boss 42 having a cross-shaped cross section both extending horizontally toward the back of the reflector 3. These two bosses are connected to each other via connector plates 43, 44 extending between those bosses and between the cylindrical boss 41 and the reflector 3, respectively, for the purpose of improving mechanical strength of the bosses 41 and 42. The cylindrical boss 41 has a threaded hole 45 at the distal end, into which a screw 7 is threaded to secure the grooved ball bearing 21. Further the cross-shaped boss 42 has a cylindrical fitting pin 46 protruding rearward from the crossing center of the cross section of the cross-shaped boss 42.

Figure 5:
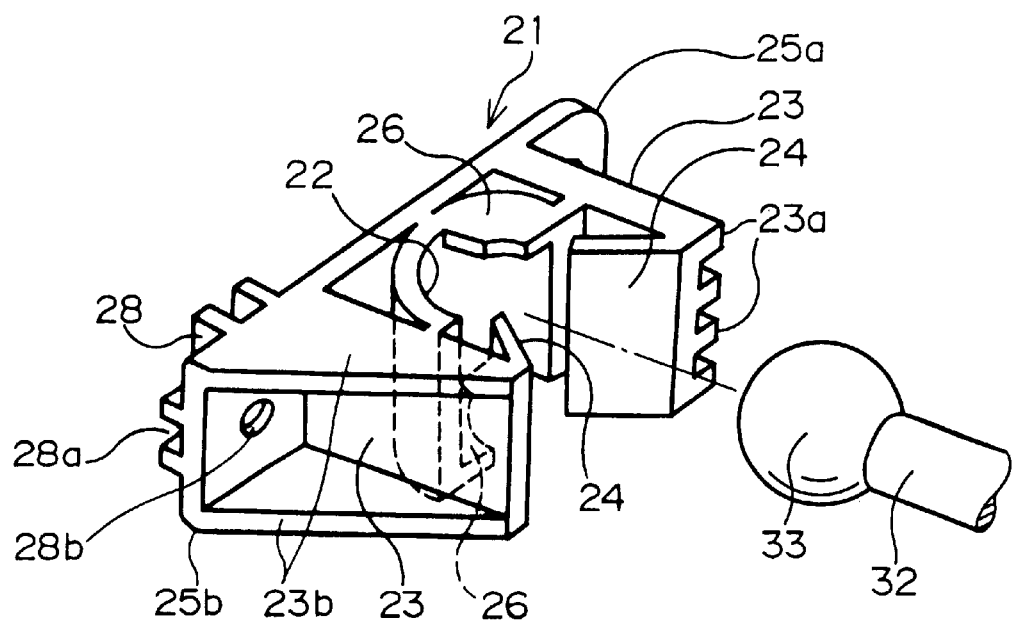
FIG. 5 is a frontal perspective view of the grooved ball bearing.
Figure 6A:
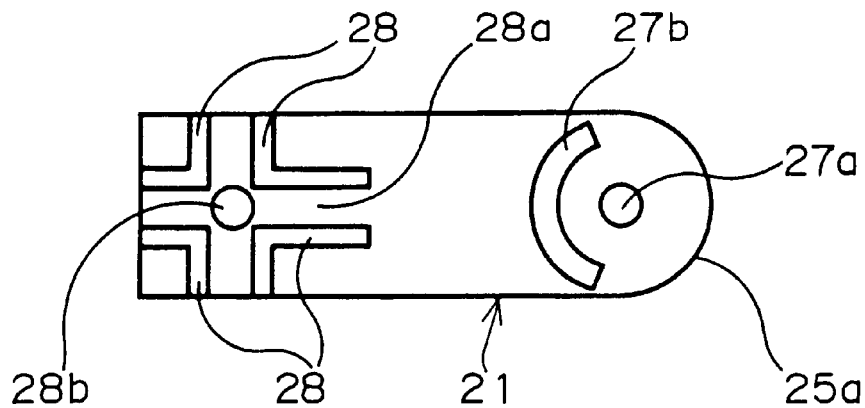
FIG. 6 shows a rear side view (rear elevational view) and a plan view of the grooved ball bearing, respectively.
Figure 6B:
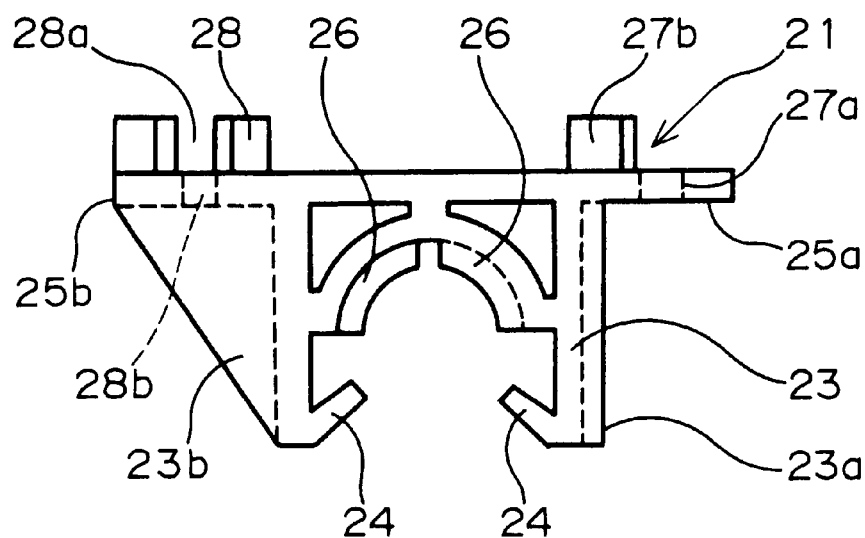
Figure 8:
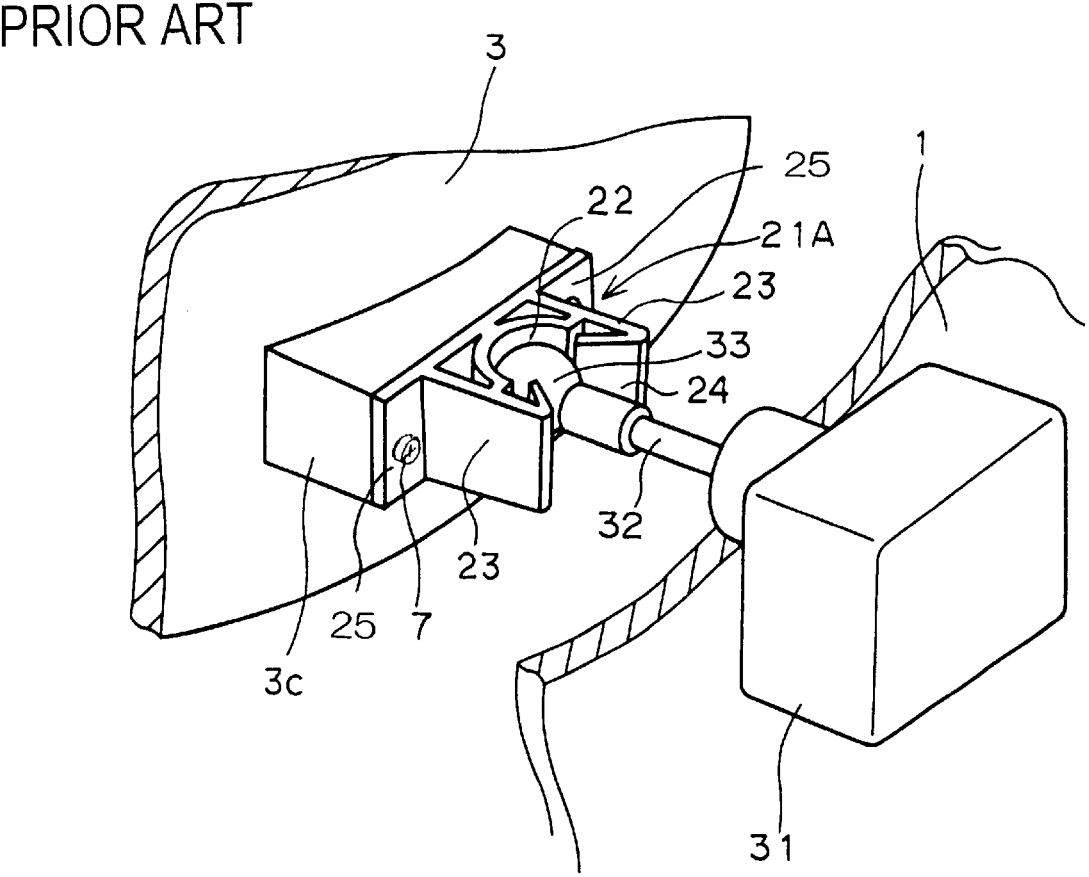
FIG. 8 is a perspective explanatory view showing a concept of a device for a tilting reflector.

FIG. 5 is a frontal perspective view of the grooved ball bearing 21, and FIGS. 6A, 6B are rear and plan views, respectively. The grooved ball bearing 21 has basically the same structure as that of the prior art shown in FIG. 8. More specifically, it is provided with a groove 22 of a semi-tubular shape having the inner diameter approximately the same as that of the spherical end 33 of the actuator rod 32, a pair of engagement pieces 23 disposed along and at both sides of the groove 22 to protrude therefrom toward the aperture, each end piece 24 of which is bent toward the groove 22 at an acute angle constituting a wedge shape, and anchor parts 25a, 25b each protruding outward from the base of the engagement piece 23 at both sides of the groove 22, and is formed by the resin molding. Both ends of the groove 22 in its axial direction are integrally provided with arch shaped end stoppers 26 that extend inwards from opposed sides. The draft direction of the molding die for the grooved ball bearing 21 is set along the direction of the groove 22. Accordingly each cross section of the groove 22, engagement piece 23 and anchor part 25a, 25b has the identical shape along the axial direction of the groove 22. In order to allow drafting during release of the molding die, the end stoppers 26 are disposed in a mutually offsetting manner with respect to the groove 22 for enabling the molding die to be released off from the molded product.

A first anchor part 25a of the anchor parts 25a, 25b provided at both sides of the grooved ball bearing 21 has a through hole 27a through which the screw is threaded into the threaded hole 45 formed in the cylindrical boss 41 of the lower stem 3b. An arched guide wall 27b is provided to project backward from the back of the first anchor part 25*a*. It can abut against the outer peripheral surface of the cylindrical boss 41. According to this embodiment, a plurality of ribs 23*a* constituting parallel raised rows of ridges are formed on the exterior face of the engagement piece 23 facing the first anchor part 25*a*, thereby improving the strength thereof. Meanwhile, the second anchor part 25*b* has reinforcing flanges 23*b* of a triangular wing shape formed integrally therewith at opposite ends in the direction of the groove 22, thereby improving the strength of the groove 22 and the second anchor part 25*b*. At the back of the second anchor part 25*b*, four L-shaped fitting walls 28 are erected to form jointly a cross-shaped gap 28*a*, into which the distal end of the cross-shaped boss 42 of the lower stem 3*b* can be fitted. Also a pin hole 28*b* is formed at the crossing center of the cross-shaped gap 28*a*, into which the fitting pin 46 of the cross-shaped boss 42 is fitted.

With such arrangement described above, the grooved ball bearing 21 is secured to the distal end of the lower stem 3*b* such that the open side of the groove 22 is confronted by the actuator 31 for tilting movement. More particularly, at the second anchor part 25*b*, the distal end of the cross-shaped boss 42 of the lower stem 3*b* is fitted into the cross-shaped gap 28*a* defined by the four fitting walls 28. At the same time, the fitting pin 46 of the cross-shaped boss 42 is inserted into the pin hole 28*b* of the grooved ball bearing 21. In addition, at the first anchor part 25*a* of the grooved ball bearing 21, the screw 7 is threaded from the back side through the hole 27*a* into the threaded hole 45 of the cross-shaped boss 41 for securing the grooved bearing to the lower stem 3*b* while the arched guide wall 27*b* abuts against a portion of the circumferential surface of the cylindrical boss 41. This means that the process of securing the grooved ball bearing 21 to the lower stem 3*b* can be achieved in a simple manner by only inserting the fitting pin 46 into the pin hole 28*b* and fitting the tip of the distal end of the cross-shaped boss 42 into the cross-shaped gap 28*a* of the fitting walls 28 at the second anchor part 25*b* of the grooved ball bearing 21. Then at the first anchor part 25*a*, the screw 7 is threaded into the threaded hole 45 via the through hole 27*a*. Therefore according to such arrangement, the process of securing the grooved ball bearing 21 does not require any troublesome work other than fastening one screw 7, thus improving the efficiency of assembling process for a lamp.

Figure 7:
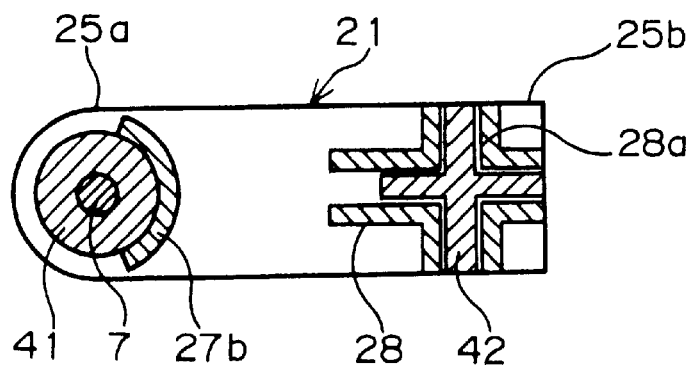
FIG. 7 is a cross sectional view taken along line C—C in FIG. 3.

As shown in FIG. 7 representing a vertical cross section taken along line C—C in FIG. 3, in the state where the grooved ball bearing 21 is secured to the lower stem 3*b*, the cross-shaped boss 42 is fitted into the cross-shaped gap 28*a* defined by the fitting walls 28. Therefore, dislocation of the relative position between the cross-shaped boss 42 and the grooved ball bearing 21 is restrained by the structure where the cross-shaped boss 42 abuts against the cross-shaped gap 28*a* in the vertical and lateral directions. Even when the grooved ball bearing 21 is deformed backward relative to the cross-shaped boss 42, the fitting state of the cross-shaped boss 42 is not brought to be out of the cross-shaped boss 28*a* by fitting the fitting pin 46 into the pin hole 28*b*. The grooved ball bearing 21 is secured to the cylindrical boss 41 at the first anchor part 25*a* with the screw 7. The grooved ball bearing 21 is positioned with respect to the cylindrical boss 41 by bringing the guide wall 27*b* into abutment against the outer peripheral surface of the cylindrical boss 41. At the first anchor part 25*a*, an obstacle such as a triangular wing-like reinforcing flange provided at the second anchor part 25*b* does not interfere with the fastening operation of the screw 7.

In the grooved ball bearing 21 secured to the low stem 3*b*, the spherical end 33 of the actuator rod 32 is fitted into the gap defined by the groove 22 and the end piece 24 of the pair of engagement pieces 23 as shown in FIG. 3. During such fitting process, the spherical end 33 moves vertically from the front opening of the groove 22. Then it is brought into abutment against the respective exterior face of the pair of end pieces 24. It further enters while deforming the end piece 24 resiliently inward, and moves past the end piece 24 to be finally received and fitted in the gap. The fitted spherical end 33 is brought into abutment against the inner bottom surface of the groove 22 and the edges of the end piece 24 at a plurality of points on its spherical surface. Accordingly the spherical end 33 is pivotally and moveably supported at the abutted points. The groove 22 and the engagement piece 23 have uniform cross sections at any point along the groove axis, which allows the spherical end 33 to move freely along the groove axis. Meanwhile the spherical end 33 is prohibited to move out of the groove forward by the end piece 24. As the end stoppers 26 extend inward of the groove 22, the spherical end 33 is kept from slipping out of the groove 22 from both ends in the direction of the groove axis.

The constructed device 8 for tilting a reflector operates in the following manner. The actuator 31 for tilting movement is driven upon the receipt of the control signal sent from the control circuit, not illustrated, to move the actuator rod 32 in a direction of the optical axis of the lamp, i.e. in the direction X shown in FIGS. 2 and 3. The grooved ball bearing 21 secured to the reflector 3 is moved in the optical axis direction together with the spherical end 33 of the actuator rod 32. Accompanied with this, the reflector 3 is tilted vertically about the pivot unit 11. During this operation, the spherical end 33 allows relative vertical movements between the reflector 3 and the actuator rod 32 owing to tolerance generated in the axial direction of the groove in the grooved ball bearing 21. As a result, the reflector 3 is tiltably moved in the vertical direction by the reciprocating linear movement of the actuator rod 32. This makes it possible to maintain the angle of the optical axis of the headlamp HL constant following up the leveling fluctuation of the vehicle body.

Alternatively, the guide wall of the first anchor part for the grooved ball bearing may be a cylindrical guide wall to surround the entire circumference of the cylindrical boss. This arrangement makes the securing system more reliable because the grooved ball bearing is fitted into the lower stem at both the first and second anchor parts. It is also possible to employ the securing system as fastener means like a caulking instead of the screw for securing the first anchor part. Also the cross-shaped gap defined by the fitting walls of the grooved ball bearing may be designed into an arbitrary shape such as an X-shape or parallel-cross, so long as the thus jointed members will not be dislocated neither in the vertical nor lateral directions. The foregoing embodiments are described for the headlamp using an automatic leveling unit for optical axis adjustment. However, the present invention may also be applied to vehicle lamps so long as it includes a headlamp provided with a device for tilting the reflector in the lamp body to adjust the optical axis, and also provided with an automatic or manually operating the actuator for tilting movement having a spherical end as described in the foregoing embodiment and a grooved.ball bearing mounted to the reflector.

As described above, the present invention provides a structure of the ball bearing constituting the device for tilting the reflector, which includes first and second anchor parts. The first anchor part is secured to the reflector using the fastening means, and the second anchor part is fitted to the reflector. As the first anchor part is required to be secured to the reflector using the fastening means, and the second anchor part is required only to be fitted therewith, the process for securing the ball bearing can be simplified. Furthermore, at the second anchor part, the top end of the cross-shaped boss at the reflector side is fitted into the cross-shaped gap defined by the fitting walls. Also the fitting pin is fitted into the pin hole formed in the ball bearing, thus preventing the relative dislocation between the ball bearing and the reflector. Even when the pin is loosened over an extended period of use, the structure of the second anchor part prevents the positional dislocation of the ball bearing. Hence the present invention ensures a smooth movement of the device for tilting a reflector, thus improving the precision in the reflector movement.

Several embodiments of the invention have been described herein, but it should be understood that various additions and modifications could be made which fall within the scope of the following claims.

What is claimed is:

1. A vehicle lamp having a lamp body comprising:

a reflector disposed within the lamp body;

a light source detachably installed to the reflector;

an actuator for tiltably moving the reflector with respect to the lamp body, wherein the actuator is disposed on the lamp body and having an actuator rod which is actuated to move linearly along the optical axis of the reflective; and a ball bearing secured to the reflector to support pivotally a distal spherical end of the actuator rod so as to convert the linear movement thereof into the tilting movement of the reflector, the ball bearing having first and second anchor parts to be secured to the reflector, the first anchor part being constructed to be secured to the reflector by a fastener means, and the second anchor part being constructed to be fitted with the reflector, wherein the second anchor part has a pin hole at the crossing center of the cross-shaped gap, and the reflector is provided with a pin projecting from the top end of the cross-shaped boss so as to be fitted into the pin hole, the second anchor part has a plurality of fitting walls disposed to define a cross-shaped gap therebetween, and the reflector is integrally provided with a cross-shaped boss having cross-shaped cross section, which can be fitted into the cross-shaped gap.

2. A device for tiltably moving a reflector disposed within a vehicle lamp comprising:

an actuator for tiltably moving the reflector with respect to a lamp body, disposed on the vehicle lamp, the actuator having an actuator rod actuated to move linearly along an optical axis of the reflector; and a ball bearing secured to the reflector to support pivotally a distal spherical end of the actuator rod so as to convert the linear movement of the actuator rod into the tilting movement of the reflector, the ball bearing having first and second anchor parts to be secured to the reflector, the first anchor part being constructed to be secured to the reflector by a fastener means, and the second anchor part being constructed to be fitted with the reflector, wherein the second anchor part has a plurality of fitting walls disposed to define a cross-shaped gap therebetween, and the reflector is integrally provided with a cross-shaped boss having cross-shaped cross section, which can be fitted into the cross-shaped gap, the second anchor part has a pin hole at the crossing center of the cross-shaped gap, and the reflector is provided with a pin projecting from the top end of the cross-shaped boss so as to be fitted into the pin hole.

* * * * *